(12) United States Patent
Toutenhoofd

(10) Patent No.: US 10,527,925 B2
(45) Date of Patent: Jan. 7, 2020

(54) FULLY-SPHERICAL IMAGING SYSTEM, CAMERA SUPPORT FOR SAME, AND ASSOCIATED METHODS

(71) Applicant: Nico Toutenhoofd, Boulder, CO (US)

(72) Inventor: Nico Toutenhoofd, Boulder, CO (US)

( * ) Notice: Subject to any disclaimer, the term of this patent is extended or adjusted under 35 U.S.C. 154(b) by 0 days.

(21) Appl. No.: 15/974,295

(22) Filed: May 8, 2018

(65) Prior Publication Data

US 2018/0335689 A1 Nov. 22, 2018

Related U.S. Application Data

(60) Provisional application No. 62/506,801, filed on May 16, 2017.

(51) Int. Cl.
| | |
|---|---|
| *G03B 37/04* | (2006.01) |
| *G03B 17/56* | (2006.01) |
| *B64C 39/02* | (2006.01) |
| *B64D 47/08* | (2006.01) |
| *G03B 37/02* | (2006.01) |

(52) U.S. Cl.
CPC ............ *G03B 37/04* (2013.01); *B64C 39/024* (2013.01); *B64D 47/08* (2013.01); *G03B 17/561* (2013.01); *G03B 37/02* (2013.01); *B64C 2201/127* (2013.01)

(58) Field of Classification Search
CPC .................................................... G03B 37/02
See application file for complete search history.

(56) References Cited

U.S. PATENT DOCUMENTS

| | | | |
|---|---|---|---|
| 6,304,284 B1* | 10/2001 | Dunton | G06T 3/4038 348/36 |
| 6,459,451 B2 | 10/2002 | Driscoll, Jr. et al. | |
| 6,754,400 B2 | 6/2004 | Florin et al. | |
| 6,778,211 B1* | 8/2004 | Zimmermann | G06T 15/20 345/629 |
| 8,072,482 B2 | 12/2011 | Gibbs et al. | |
| 9,458,963 B1 | 10/2016 | Choi et al. | |
| 2004/0109078 A1* | 6/2004 | Artonne | G03B 27/735 348/335 |
| 2008/0316368 A1* | 12/2008 | Fritsch | H04N 5/23203 348/722 |
| 2010/0045773 A1* | 2/2010 | Ritchey | G02B 13/06 348/36 |
| 2016/0142632 A1 | 5/2016 | Lyon et al. | |

OTHER PUBLICATIONS

MrCheesyCam. "Pico Flex Dolly Video Demo." YouTube. YouTube, Aug. 31, 2011. Accessed Jan. 30, 2019. https://www.youtube.com/watch?v=PkaP4Oz0-RU.*

* cited by examiner

*Primary Examiner* — Noam Reisner
(74) *Attorney, Agent, or Firm* — Lathrop Gage LLP

(57) ABSTRACT

A fixed-pivot camera support for fully-spherical imaging, includes a base, a support art, and a camera mount. The base is configured to move in a circular path centered about a pivot axis. The support arm has a proximal end attached to the base, and a distal end extending beyond the base toward the pivot axis. The camera mount is on the distal end and is configured to position an optical axis of a camera to intersect the pivot axis.

10 Claims, 7 Drawing Sheets

FULLY-SPHERICAL IMAGING SYSTEM, CAMERA SUPPORT FOR SAME, AND ASSOCIATED METHODS

CROSS-REFERENCE TO RELATED APPLICATIONS

This application claims priority to U.S. Provisional Application No. 62/506,801 filed May 16, 2017, the content of which is incorporated by reference in its entirety.

BACKGROUND

Panoramic imaging has become an increasingly popular feature in recreational and commercial photography. Commercial applications include virtual reality, augmented reality, and virtual tours, e.g., for advertising an indoor or an outdoor location.

DETAILED DESCRIPTION OF THE EMBODIMENTS

Hardware and techniques for capturing panoramic images have been known for some time. However, such hardware and techniques either rely on taking several images from different perspective points or result in panoramic images that include image-capturing equipment, such as a tripod, photographer, or other means to support the camera capturing the panoramic image.

Figure 1A:
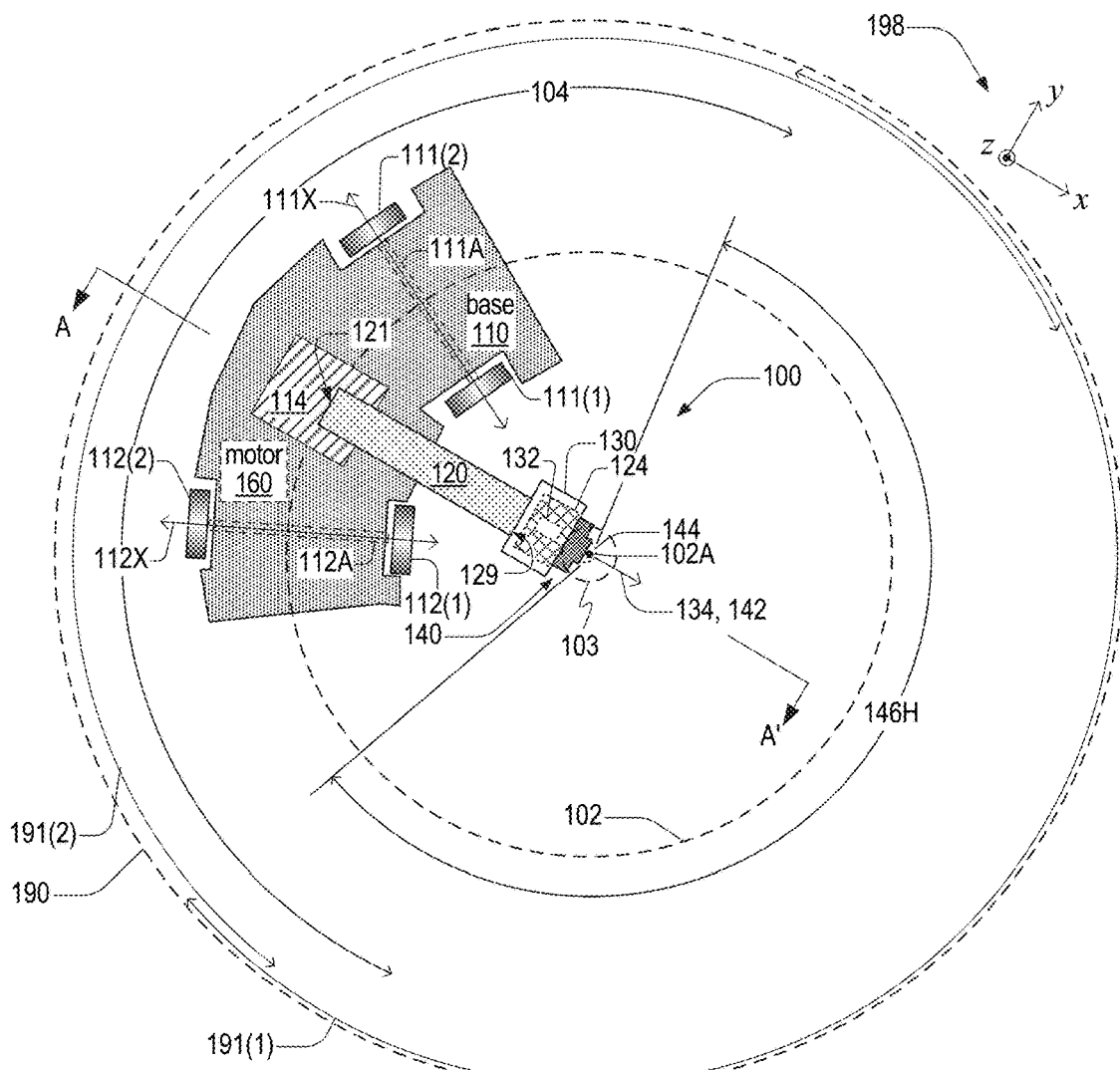
FIG. 1A is a plan view of a fixed-pivot camera support for fully-spherical imaging system, in an embodiment.
Figure 1B:
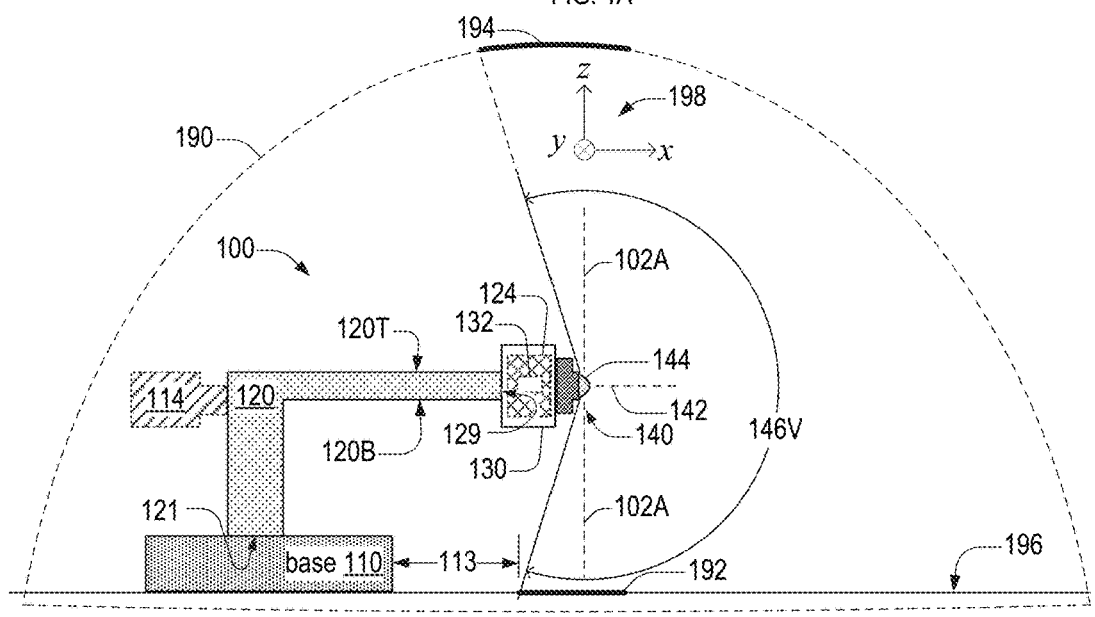
FIG. 1B is a cross-sectional view of the fixed-pivot camera support of FIG. 1A.

FIGS. 1A and 1B are, respectively, a plan view and a cross-sectional view of a fixed-pivot camera support 100 for fully-spherical imaging. FIGS. 1A and 1B are best viewed together in the following description. Fixed-pivot camera support 100 includes a base 110, a support arm 120, and a camera mount 130. FIG. 1A also illustrates camera 140 mounted on camera mount 130, such that FIG. 1A depicts camera mount 130 as a dashed-line rectangle. The cross-sectional view of FIG. 1B is along cross-sectional plane A-A', which intersects support arm 120. Base 110 is on a surface 196.

FIGS. 1A and 1B include a coordinate system 198 that defines orthogonal axes x, y, and z. Herein, reference to an axis x, y, or z or associated direction±x, ±y, or ±z refers to coordinate system 198. Circular path 102 is in a plane parallel to the x-y plane of coordinate system 198.

Base 110 is configured to move in a circular path 102 centered about a pivot axis 102A. Base 110 may include at least one of inner wheel 111(1), outer wheel 111(2), inner wheel 112(1), and outer wheel 112(2). Base 110 may also include an axle 111A, upon which at least one of inner wheel 111(1) and outer wheel 111(2) rotate, and an axle 112A, upon which at least one of inner wheel 112(1) and outer wheel 112(2) rotate. Axles 111A and 112A are configured to constrain rolling motion of base 110 to circular path 102 centered about pivot axis 102A. Support arm 120 has a proximal end 121 attached to base 110, and a distal end 129 extending beyond base 110 toward pivot axis 102A. Support arm 120 also includes a top surface 120T and a bottom surface 120B. In FIG. 1A, camera 140 obscures distal end 129. As FIG. 1B illustrates, camera mount 130 may be on distal end 129 and configured to position an optical axis 142 of camera 140 such that optical axis 142 intersects pivot axis 102A.

Alternatively, camera mount 130 may be attached to support arm 120 such that either part of top surface 120T is beneath camera mount 130 (in −z direction) or bottom surface 120B is above camera mount 130 (in +z direction). For example, camera mount 130 may hold camera 140 such that optical axis 142 does not intersect support arm 120.

Support arm 120 may be a cantilever arm. While FIG. 1B illustrates support arm 120 as having only a vertical component (parallel to the x-z plane) and a horizontal component (parallel to the x-y plane), support arm may be differently shaped without departing from the scope hereof. For example, support arm 120 may include one or more of a diagonal component and a curved component. Camera mount 130 may be integrated into support arm 120. Alternatively, camera mount 130 may be mechanically attached, or otherwise attached, to support arm 120.

In an embodiment, no part of fixed-pivot camera support 100 intersects pivot axis 102A when camera 140 is attached to camera mount 130. For example, FIG. 1A denotes a cylindrical volume 103 that is coaxial with pivot axis 102A and concentric with circular path 102. Axles 111A and 112A may be configured to constrain rolling motion of fixed-pivot camera support 100 to a circular path 102 such that no part of fixed-pivot camera support 100 is within cylindrical volume 103 when fixed-pivot camera support 100 traverses circular path 102.

Fixed-pivot camera support 100 may also include a counterweight 114 attached to support arm 120. When included, counterweight 114 may be attached to support arm 120 closer to proximal end 121 than to distal end 129. Camera mount 130 may also include an actuator 132 configured to translate camera 140 along a linear path 134 that intersects pivot axis 102A. Linear path 134 may be in cross-sectional plane A-A'.

Base 110 may include a first axle 111A through first wheel 111 and length-wise oriented along a first axis 111X intersecting pivot axis 102A. Base 110 may also include a second axle 112A through second wheel 112 and length-wise oriented along a second axis 112X intersecting pivot axis 102A. Fixed-pivot camera support 100 may also include a motor 160 that is mechanically coupled to wheels 111 and 112. For example, motor 160 configured to turn one of wheels 111(1) and 111(2), and to turn one of wheels 112(1) and 112(2), e.g., mechanically coupling to at least one of axles 111A and 112A. Motor 160 may be battery-powered or mechanically powered, e.g., via rotation of a crank mechanically coupled to motor 160.

Camera 140 includes a lens 144 having optical axis 142. Camera mount 130 may be configured to position lens 144 such that pivot axis 102A intersects at least one of an entrance pupil and a nodal point of lens 144. Camera mount 130 may include a positioner 124, e.g., a three-axis gimbal positioner, to enable positioning the at least one of an entrance pupil and a nodal point of lens 144 within a predetermined distance from pivot axis 102A, in which the resulting proximity is sufficient for reducing parallax errors to a tolerable level. The predetermined distance is 0.2 millimeters, for example. Positioner 124 is, for example, a MI-8100 Precision Gimbal Positioner manufactured by MI Technologies (Suwanee, Ga.), or a positioner with equivalent specifications. Positioner 124 may include actuator 132.

Camera 140 has a horizontal field of view 146H and a vertical field of view 146V such that camera 140 images part of a scene 190. Scene 190 completely surrounds camera 140. For example, scene 190 is a surface of an ellipsoid intersected by pivot axis 102A. Scene 190 includes a nadir region 192 directly beneath camera mount 130 and an apex region 194 directly above camera mount 130. Pivot axis 102A may intersect one or both of nadir region 192 and apex region 194.

Scene 190 includes a plurality of scene regions 191(1, 2, . . . ), of which scene regions 191(1) and 191(2) are illustrated in FIG. 1A. Scene regions 191(1) and 191(2) overlap, such that images of scene regions 191(1) and 191(2) captured by camera 140 may be registered and stitched together to form a panoramic image, such as a spherical panoramic image. The panoramic image may also be constructed from, in addition to scene regions 191(1,2) one or more additional scene regions 191(•), which may also overlap.

Horizontal field of view 146H is in a first plane that is perpendicular to pivot axis 102A and parallel to the x-y plane. Horizontal field of view 146H exceeds 180° for facilitating image stitching. For example, field of view 146H is between 190° and 230°. When camera 140 is attached to camera mount 130, the entirety of fixed-pivot camera support 100 is located outside horizontal field of view 146H. Horizontal field of view 146H may be less than or equal to 180° without departing from the scope hereof.

Vertical field of view 146V is in a second plane that includes pivot axis 102A and is perpendicular to the x-y plane. Vertical field of view 146V exceeds 180°. When camera 140 is attached to camera mount 130, the entirety of fixed-pivot camera support 100 is located outside vertical field of view 146V such that the respective images of nadir region 192 and apex region 194 include no part of fixed-pivot camera support 100. Vertical field of view 146V may be less than or equal to 180° without departing from the scope hereof.

Base 110 is located at a distance 113 from a bottom edge of field of view 146V. For increasing stability of camera support 100, distance 113 may be minimized to a non-zero distance to both ensure stability while preventing encroachment of base 110 into field of view 146V.

Figure 2:
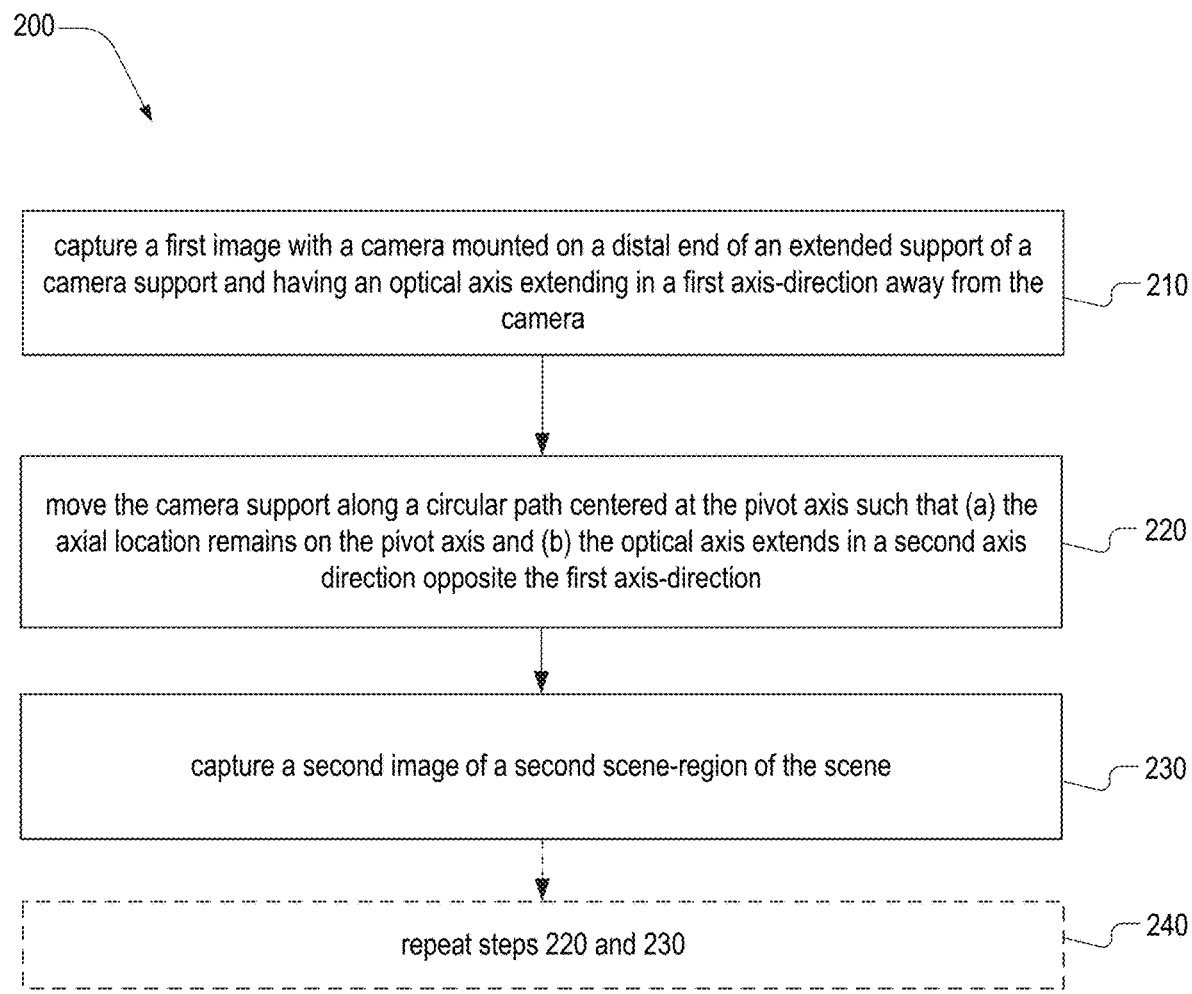
FIG. 2 is a flowchart illustrating a method for capturing a panoramic image of a scene, in an embodiment.

FIG. 2 is a flowchart illustrating a method 200 for capturing a panoramic image of a scene. Method 200 may be implemented by fixed-pivot camera support 100 and camera 140, in which the scene is scene 190. Method 200 includes at least one of steps 210, 220, and 230.

Step 210 includes capturing a first image with a camera mounted on a distal end of a support arm of a fixed-pivot camera support and having an optical axis extending in a first axis-direction away from the camera. The first image is of a first scene-region of the scene when a pivot axis of the fixed-pivot camera support intersects an axial location on the optical axis. The axial location is, for example, an entrance pupil of the camera or a nodal point. In an example of step 210, camera 140 is mounted on distal end 129 of support arm 120, and captures a first image of scene region 191(1) when a pivot axis 102A intersects a location on optical axis 142.

Step 220 occurs after step 210 and includes moving the fixed-pivot camera support along a circular path centered at the pivot axis such that (a) the axial location remains on the pivot axis and (b) the optical axis extends in a second axis-direction different from the first axis-direction. The second axis-direction may be opposite the first axis-direction. In an example of step 220, motor 160 moves proximal end 121 of support arm 120 in a circular path about pivot axis 102A that corresponds to angle 104. Angle 104 is, for example, 60°, 90°, or 180°, or a value therebetween.

During step 220, the axial location may remain less than or equal to a predetermined distance, which is a misalignment tolerance from the pivot axis. Scene 190 may include an object at a first distance from the camera. In step 220, the predetermined tolerance may be a monotonically or strictly increasing function of the first distance. The camera may be configured to have a depth of focus when capture an image of the scene. The predetermined tolerance may be less than this depth of focus.

Step 230 occurs after step 220 and includes capturing a second image of a second scene-region of the scene. In an example of step 230, camera 140 captures a second image of scene region 191(2).

In an embodiment, execution of method 200 requires capturing two and only two images: the first image of step 210 and the second image of step 230, for example. Other embodiments of method 200 include capturing more than two images. For example, method 200 may also include a step 240, which includes repeating, after the first execution of step 230, steps 220 and 230. Method 200 may include multiple executions of step 240. In each repeated execution of step 230, the optical axis extends in a respective axis direction that differs from previous axis directions associated with previous executions of step 230. In an example of step 240, scene 190 completely surrounds camera 140, angle 104 is 90°, and step 240 includes repeating steps 220 and 230 three times such that camera 140 captures a spherically panoramic image of scene 190.

Figure 3:
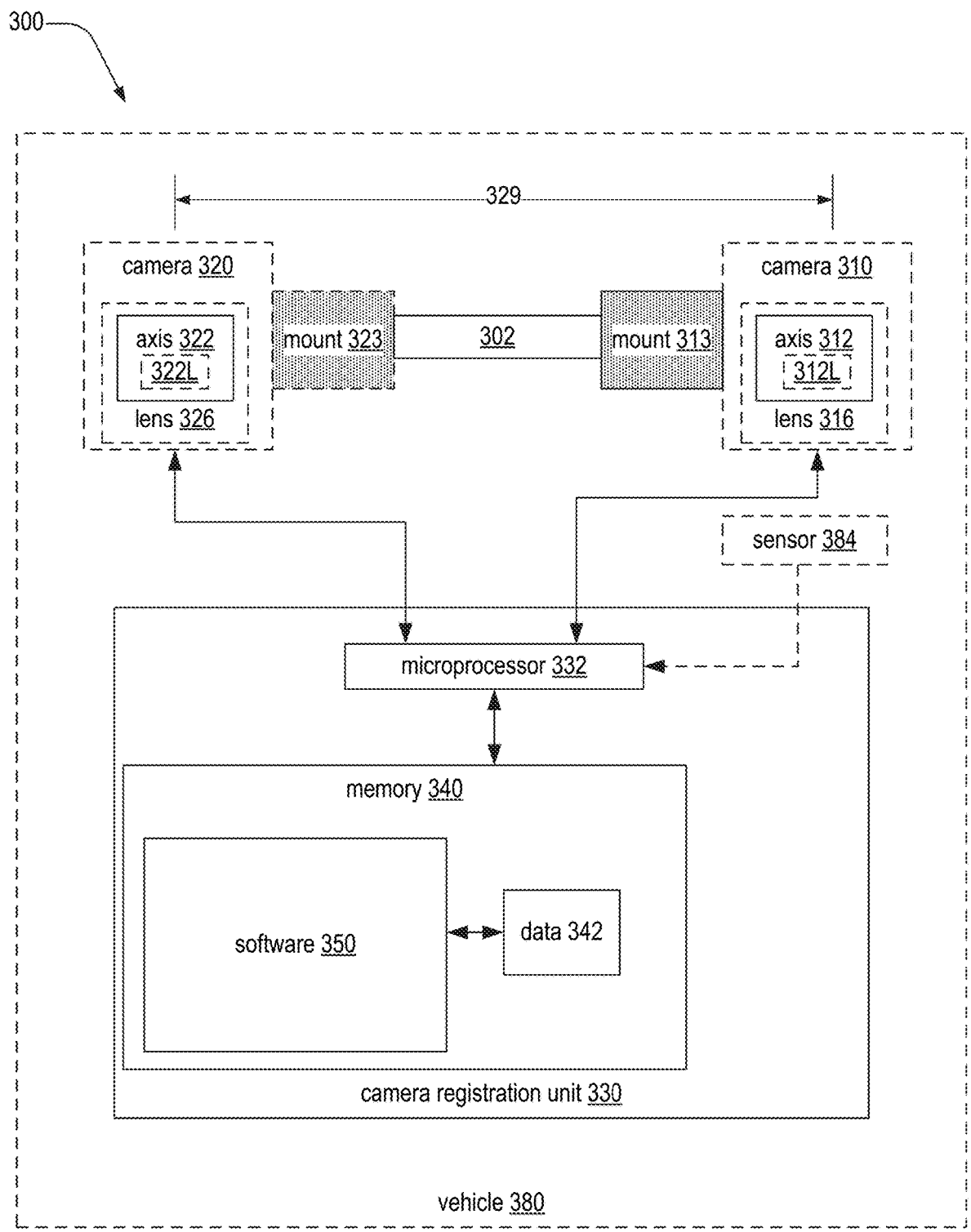
FIG. 3 is a functional block diagram of a fully-spherical imaging system, in an embodiment.

FIG. 3 is a functional block diagram of a fully-spherical imaging system 300 for capturing a panoramic image of a scene. Imaging system 300 includes at least one of a structural element 302, a first camera mount 313, a second camera mount 323, and a camera registration unit 330. Camera registration unit 330 includes a microprocessor 332 and a memory 340 that stores software 350 and optionally data 342. Camera registration unit 330 may be collocated with, e.g., via removable or non-removable attachment to, at least one of structural element 302, mount 313, and mount 323. Imaging system 300 may also include at least one of a first camera 310 and a second camera 320, and does so in the following description.

Memory 340 may be transitory and/or non-transitory and may represent one or both of volatile memory (e.g., SRAM, DRAM, computational RAM, other volatile memory, or any combination thereof) and non-volatile memory (e.g., FLASH, ROM, magnetic media, optical media, other non-volatile memory, or any combination thereof). Part or all of memory 340 may be integrated into microprocessor 332.

First camera 310 and second camera 320 have respective optical axes 312 and 322. First camera mount 313 is configured to hold first camera 310 such that optical axis 312 extends in a first axis-direction away from first camera 310. Second camera mount 323 is configured to hold second camera 320 such optical axis 322 extends in a second axis-direction differing from the first axis-direction. The second axis-direction may be 180°±δ opposite the first axis-direction. Tolerance angle δ is, for example, one degree or five degrees. Without departing from the scope hereof, the angle between first axis-direction and second axis-direction may be outside the range defined by 180°±δ.

First camera mount 313 may hold first camera 310 such that first camera mount 313 is outside a field of view of first camera 310. Second camera mount 323 may hold second camera 320 such that second camera mount 323 is outside a field of view of second camera 320.

Camera mounts 313 and 323 may be mechanically coupled via a structural element 302. Structural element 302 may be part of, or attached to, a vehicle 380. Each of the following is an example of vehicle 380: a utility cart, a motorized cart, a fork lift, a motor vehicle, an autonomous vehicle, and an unmanned aerial vehicle. Vehicle 380 may include a sensor 384 for determining speed of vehicle 380. Sensor 384 may be communicatively coupled to camera registration unit 330, and may include one or more of a speedometer, a wheel-speed sensor, and a tachometer.

Microprocessor 332 is communicatively coupled to first camera 310 and second camera 320, e.g., via at least one of a bus, a wireless communication channel, and a wired communication channel. Microprocessor 332 is configured to execute software 350 to capture, with first camera 310, a first image of a first scene-region of the scene. An axial location 312L on optical axis 312 when the first image is captured defines a first image-capture location.

Microprocessor 332 is also adapted to execute software 350 to capture, with second camera 320, a second image of a second scene-region of the scene when an axial location 322L on optical axis 322 is at the first image-capture location.

First camera 310 may include a lens 316 such that axial location 312L corresponds to at least one of an entrance pupil and a nodal point of lens 316. Camera 320 may include a lens 326 such that axial location 322L corresponds to at least one of an entrance pupil and a nodal point of lens 326. Axial locations 312L and 322L may be separated by a fixed distance 329, which is for example stored in memory 340 as part of data 342. Fixed distance 329 is, for example, determined by spatial dimensions of mount 313, mount 323, and structural element 302. Each of camera mount 313 and 323 may include one or more positioners 124 configured to translate axial locations 312L and 322L. Lenses 316 and 326 may be fisheye lenses with rotational symmetry about their respective optical axes 312 and 322, and have fields of view exceeding 180°. Camera 140 (FIG. 1A) is an example of both cameras 310 and 320.

In an embodiment, fully-spherical imaging system 300 does not include second camera 320, such that first camera 310 and first camera mount 313 each assume additional functionality: that of second camera 320 and second camera mount 323, respectively, described above. In such an embodiment, structural element 302 does not connect cameras 310 and 320. Rather, structural element 302 is configured to position camera 310, held by first camera mount 313, in two image-capture positions. These two image-capture positions correspond to the aforementioned configuration of first camera mount 313 and the second camera mount 323. In such an embodiment, structural element 302 may be configured to rotate first camera 310 in a plane that includes optical axis 312. Structural element 302 may include at least one rotation stage.

Figure 4:
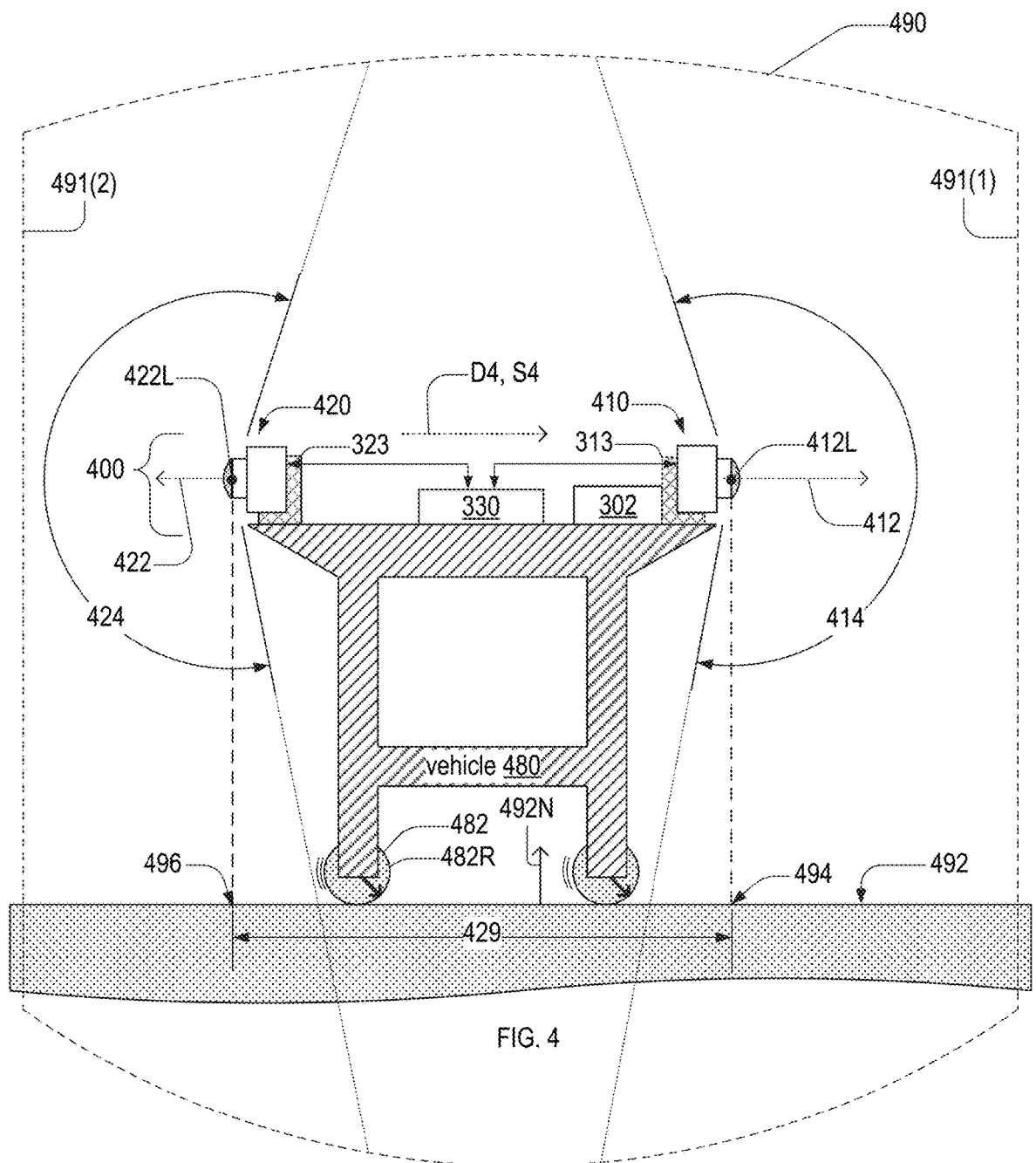
FIG. 4 is a cross-sectional view of a first example of the fully-spherical imaging system of FIG. 3.

FIG. 4 is a cross-sectional view of a fully-spherical parallax-free imaging system 400 on a vehicle 480. Imaging system 400 is an embodiment of imaging system 300.

Vehicle 480 is an example of vehicle 380 and is on a surface 492. At a location beneath vehicle 480, part of surface 492 is perpendicular to a direction 492N. Imaging system 400 includes at least one of camera 410 and camera 420, which are examples of cameras 310 and 320, respectively. Cameras 410 and 420 have respective fields of view 414 and 424, each of which may exceed 180° in the plane of FIG. 4 and in a plane perpendicular thereto. Fields of view 414 and 424 may be equal.

Cameras 410 and 420 have respective optical axes 412 and 422 and respective axial locations 412L and 422L, which are separated by distance 429. Axial locations 412L and 422L are examples of axial locations 312L and 322L and are directly above respective locations 494 and 496 of surface 492. Distance 429 is an example of distance 329. Optical axes 412 and 422 may face opposite directions, and vehicle 480 is configured to travel along a path parallel to optical axes 412 and 422. Vehicle 480 may include one or more wheels 482 having a radius 482R. Memory 340 may store radius 482R (or a related quantity such as diameter or circumference) as part of data 342. Imaging system 400 may also include at least one of camera mounts 313 and 323 configured to translate axial locations 412L and 422L. Camera mounts 313 and 323 may be directly or indirectly attached to vehicle 480.

A scene 490 at least partially surrounds imaging system 400 in three dimensions. Scene 490 may be a panoramic scene. Scene 490 includes a first scene-region 491(1) and a second scene-region 491(2), which are in respective fields of view 414 and 424 of cameras 410 and 420. Fields of view 414 and 424 may overlap such that first scene-region 491(1) and second scene-region 491(2) overlap and hence include a common part of scene 490.

In an embodiment, fully-spherical parallax-free imaging system 400 does not include second camera 420, such that first camera 410 and first camera mount 313 each assume additional functionality: that of second camera 420 and second camera mount 323, respectively, described above. In such an embodiment, imaging system 400 includes structural element 302 configured to rotate first camera 410 in a plane that includes optical axis 412. For example, structural element 302 may be configured, e.g. by including one or two rotation stages, to rotate first camera 410 in at least one of (a) a first plane that includes optical axis 312 and direction 492N and (b) a second plane that includes optical axis 312 and a direction perpendicular to direction 492N.

Figure 5:
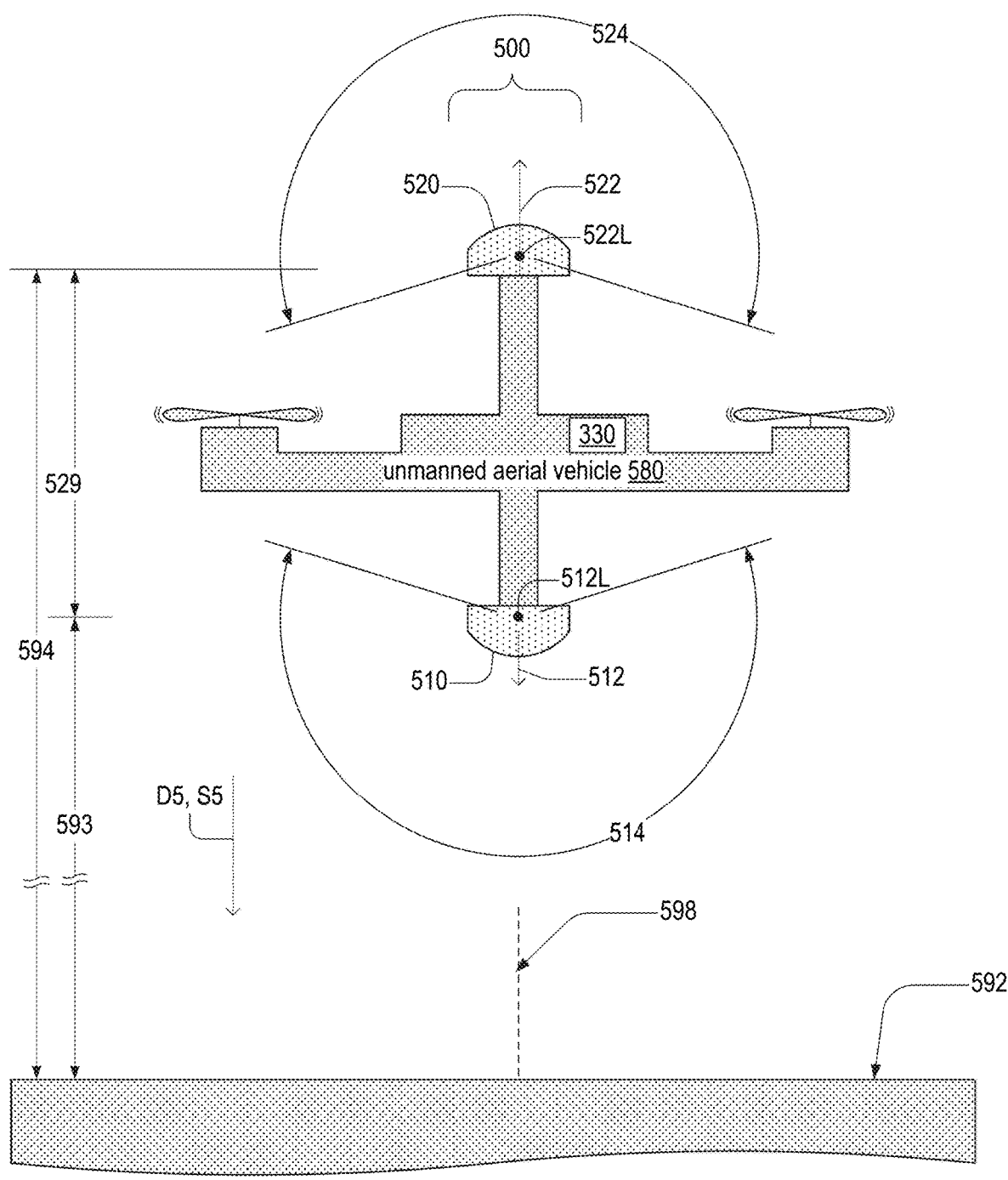
FIG. 5 is a cross-sectional view of a second example of the fully-spherical imaging system of FIG. 3.

FIG. 5 is a cross-sectional view of a fully-spherical parallax-free imaging system 500 on an unmanned aerial vehicle 580. Imaging system 500 is an embodiment of imaging system 300. Unmanned aerial vehicle 580 is an example of vehicle 380. Imaging system 500 includes cameras 510 and 520, which are examples of cameras 310 and 320, respectively. Both cameras 510 and 520 have respective fields of view 514 and 524, each of which may exceed 180° in the plane of FIG. 5 and in a plane perpendicular thereto. Fields of view 514 and 524 may be equal. Cameras 510 and 520 have respective optical axes 512 and 522 and respective axial locations 512L and 522L, which are separated by distance 529. Distance 529 is an example of distance 329. Optical axes 512 and 522 may face opposite directions, and unmanned aerial vehicle 580 is configured to travel along a path, e.g., a vertical path with respect to a horizon, parallel to the optical axes.

Unmanned aerial vehicle 580 is above a surface 592. Surface 592 may be an outside surface, such as a road surface or dirt surface, or an indoor surface such as a floor. Axial location 522L is at a height 594 above surface 592.

Axial location 512L is at a distance 593 above surface 592, which differs from height 594 by distance 529 when optical axes 512 and 522 are both perpendicular to surface 592.

Figure 6:
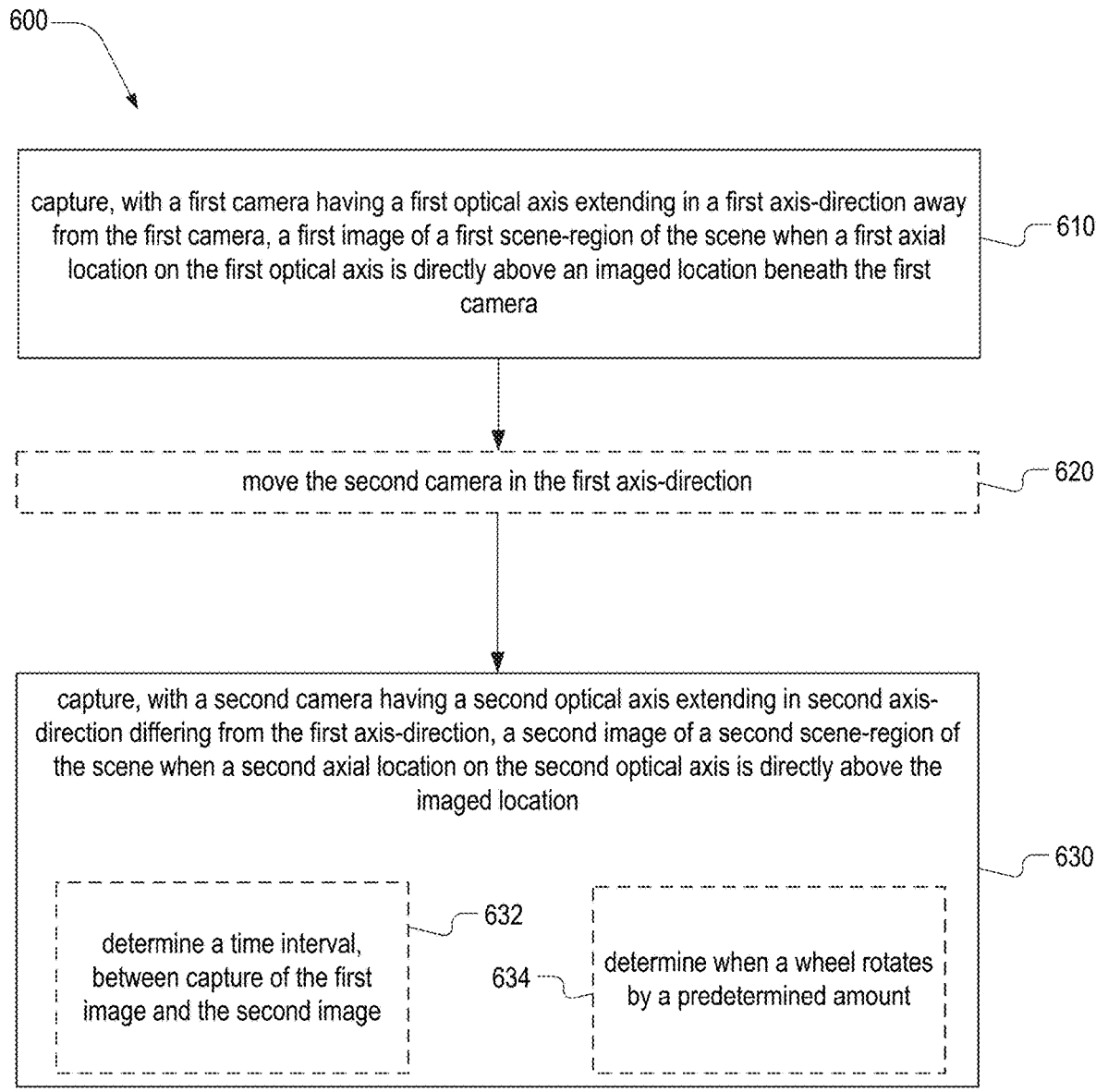
FIG. 6 is a flowchart illustrating a method for capturing a panoramic image of a scene, in an embodiment.

FIG. 6 is a flowchart illustrating a method 600 for capturing a panoramic image of a scene. Method 600 includes at least one of steps 610, 620, and 630. Step 630 may include steps 632 and 634. Method 600 is, for example, implemented within one or more aspects of imaging system 300. For example, method 600 is implemented by microprocessor 332 executing computer-readable instructions of software 350.

Method 600 may be implemented with a single camera or with two cameras, e.g., by an embodiment of imaging system 300 that includes either just one camera, or two cameras. The following description of method 600 refers to both a first camera having a first optical axis and a second camera having a second optical axis. The first camera and the second camera may be a single camera configurable, e.g., via spatial and/or rotational orientation of its field of view, to function as either the first camera or the second camera.

Step 610 includes capturing, with a first camera having a first optical axis extending in a first axis-direction away from the first camera, a first image of a first scene-region of the scene. A location on the first optical axis when the first image is captured defines a first image-capture location. In a first example of step 610, first camera 410 (FIG. 4) captures a first image of first scene-region 491(1) when location 412L is directly above location 494. In second example of step 610, first camera 510 (FIG. 5) captures a first image of a first scene-region therebeneath when location 512L is distance 593 above a location 598 on surface 592.

When method 600 includes step 620, step 620 occurs after the step 610 and before step 630. Step 620 includes moving a second camera in the first axis-direction. In a first example of step 620, vehicle 480 moves camera 420 in a direction D4 at a speed S4, in which direction D4 is parallel to optical axis 412. In a second example of step 620, vehicle 580 moves camera 520 in direction D5 at speed S5, in which direction D5 is parallel to optical axis 512.

Step 630 includes capturing, with a second camera having a second optical axis extending in second axis-direction differing from the first axis-direction, a second image of a second scene-region of the scene. In an embodiment, second image and the first image are captured simultaneously.

In an embodiment, the second image is captured when a second axial location on the second optical axis is at, or within a predetermined distance from, the first image-capture location. Scene region 491(2) may include an object at a first distance from second camera 420. The predetermined distance may be a monotonically or strictly increasing function of the first distance. The camera may be configured to have a depth of focus when capture an image of the scene. The predetermined distance may be less than this depth of focus.

In a first example of step 630, second camera 420 captures a second image of scene-region 491(2). This second image may be captured when location 422L is directly above location 494. In step 630, the second axial location on the second optical axis may be directly above the image-capture location to within a tolerance.

In a second example of step 630, second camera 520 captures a second image of a second scene-region thereabove. This second image may be captured when location 522L is distance 593 above surface 592 and directly above location 598.

Step 630 may include step 632, in which the step of capturing the second image occurs at a first time interval after the first image is captured, and the first camera and the second camera are on a vehicle traveling at a first speed in the first axis-direction. The first speed is, for example speed S4 or S5 of step 620. Step 632 includes determining the time interval based on the first speed, and a distance between the first camera and the second camera in the first axis-direction. In a first example of step 632, data 342 stores speed S4 of vehicle 480 and distance 429, and software 350 determines the time interval therefrom. In a second example of step 632, data 342 stores speed S5 of unmanned aerial vehicle 580 and distance 529, and software 350 determines the time interval therefrom.

Step 630 may include step 634, in which the first camera and the second camera are attached to a wheeled vehicle and are spatially separated by a first distance along the first axis-direction. For example, cameras 410 and 420 are separated by distance 429 in direction D4. Also in step 630, the step of capturing the second image occurs when a wheel of the wheeled vehicle rotates, after the step of capturing the first image, by a predetermined amount corresponding to the first distance. Step 634 includes determining when the wheel rotates by the predetermined amount. In an example of step 634, software 350 determines, using radius 482R (or a related quantity) and output of sensor 384, when wheel 482 rotates by an arc length corresponding to distance 429.

Figure 7:
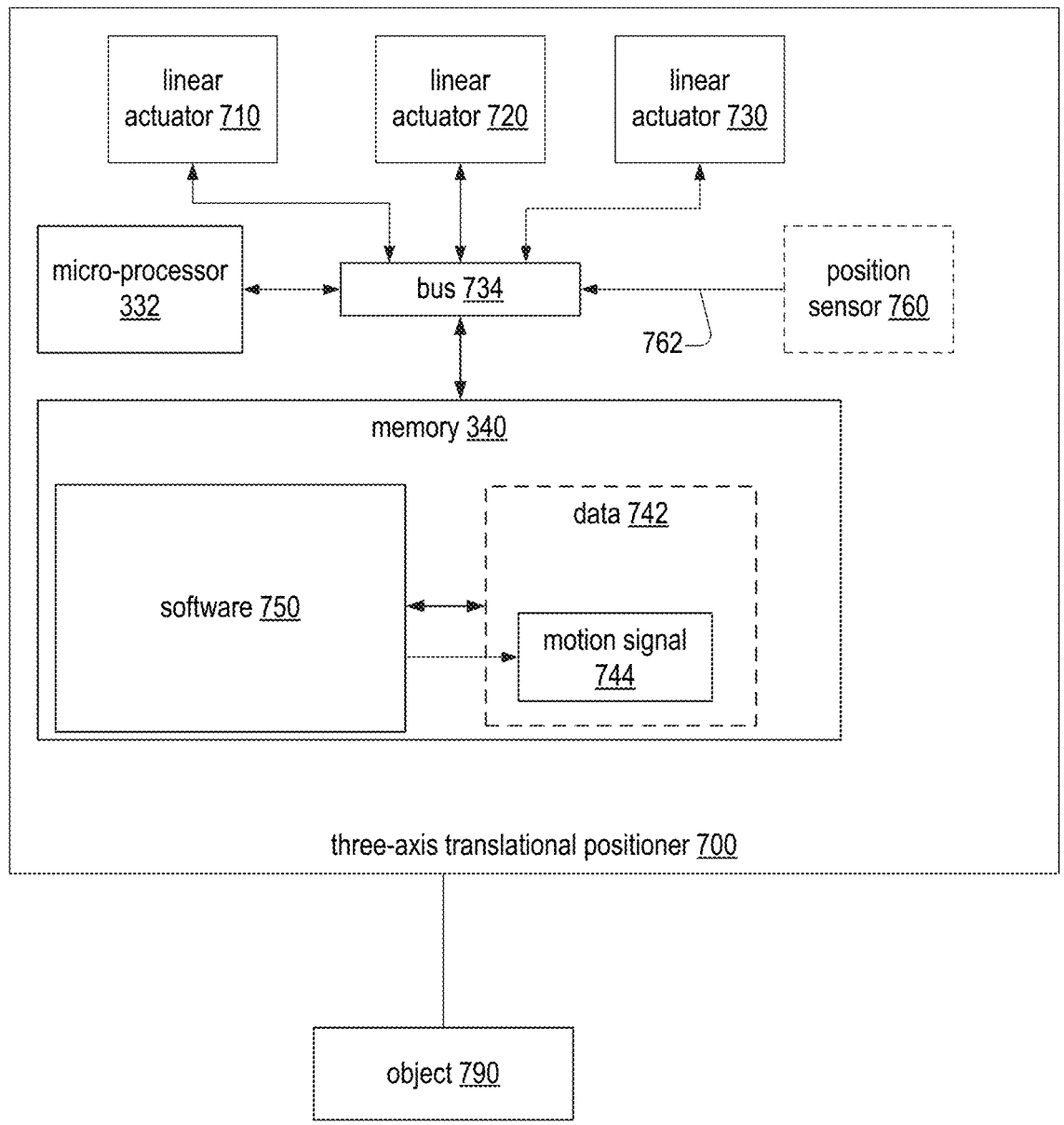
FIG. 7 is a functional block diagram of a three-axis translational positioner, in an embodiment.

FIG. 7 is a functional block diagram of a three-axis translational positioner 700, which is an embodiment of positioner 124, FIG. 1. Positioner 700 includes at least one of a first linear actuator 710, a second linear actuator 720, and a third linear actuator 730 configured to translate an object 790 attached thereto also three respective axes. The three axes may be mutually orthogonal, such as axes x, y, and z of coordinate system 198. Positioner 700 may also include microprocessor 332, a bus 734, and memory 340 that stores software 750.

Memory 340 may store data 742, which for example includes a target position of object 790 with respect to a reference object. Actuators 710, 720, and 730 are communicatively coupled to microprocessor 332.

Object 790 may be camera 140, or specifically a location within camera 140, such as least one of an entrance pupil and a nodal point of the lens 144. Positioner 700 may also include a position sensor 760 communicatively coupled to microprocessor 332.

In an example mode of operation, position sensor 760 determines a current position of the object 790 and transmits a current-position signal 762 to software 750 via bus 734. In response to current-position signal 762, software 750 generates a motion signal 744 that is transmitted via microprocessor 332 to one or more of actuators 710, 720, and 730 via bus 734. One or more of actuators 710, 720, and 730 may be closed-loop such that the closed-loop actuators transmits a signal indicating current actuator position to software 750 via bus 734.

In an embodiment, three-axis translational positioner 700 has no rotational actuators, such that it cannot change an angular orientation (e.g., pitch, yaw, and roll) of object 790.

Combinations of Features

Features described above as well as those claimed below may be combined in various ways without departing from the scope hereof. The following examples illustrate some possible, non-limiting combinations:

(A1) denotes a fixed-pivot camera support for fully-spherical imaging, includes a base, a support art, and a camera mount. The base is configured to move in a circular path centered about a pivot axis. The support arm has a proximal end attached to the base, and a distal end extending beyond the base toward the pivot axis. The camera mount is on the distal end and is configured to position an optical axis of a camera to intersect the pivot axis.

(A2) The fixed-pivot camera support denoted by (A1) may further include a first wheel; a second wheel; a first axle through the first wheel and length-wise oriented along a first axis intersecting the pivot axis; and a second axle through the second wheel and length-wise oriented along a second axis intersecting the pivot axis and being non-parallel to the first axis.

(A3) In any fixed-pivot camera support denoted by one of (A1) and (A2), the camera mount may include an actuator configured to translate the camera along a linear path that intersects the pivot axis.

(A4) Any fixed-pivot camera support denoted by one of (A1) through (A3) may further include the camera, which includes a lens having the optical axis, in which the camera mount may be further configured to position the lens such that the pivot axis intersects at least one of an entrance pupil and a nodal point of the lens.

(A5) In any fixed-pivot camera support denoted by one of (A4), when the camera is attached to the camera mount, the camera mount may be located outside a field of view of the camera, the field of view being at least 180 degrees in at least one of (a) a plane perpendicular to the pivot axis and (b) a plane that includes the pivot axis.

(A6) Any fixed-pivot camera support denoted by one of (A1) through (A5) may be configured such that neither the support arm nor the camera mount intersecting the pivot axis.

(B1) denotes a method for capturing a panoramic image of a scene. The method includes capturing, with a camera mounted on a distal end of a support arm of a fixed-pivot camera support and having an optical axis extending in a first axis-direction away from the camera, a first image of a first scene-region of the scene when a pivot axis of the fixed-pivot camera support intersects an axial location on the optical axis. The method also includes, after capturing the first image, moving the fixed-pivot camera support along a circular path centered at the pivot axis such that (a) the axial location remains on pivot axis within a predetermined tolerance, (b) the optical axis extends in a second axis-direction different from the first axis-direction, and (c) no part of the fixed-pivot camera support intersects the pivot axis. The method also includes after moving the fixed-pivot camera support, capturing a second image of a second scene-region of the scene.

(B2) In the method denoted (B1), wherein the camera includes a lens having the optical axis, the axial location may correspond to at least one of an entrance pupil and a nodal point of the lens.

(B3) In any method denoted by one of (B1) and (B2), the camera may have a field of view equal to a first angle in a plane perpendicular to the pivot axis; the step of moving the fixed-pivot camera support may include moving the fixed-pivot camera support by a second angle along the circular path, the first angle exceeding the second angle.

(B4) In any method denoted by one of (B1) through (B3), in which the scene includes an object at a first distance from the camera, in the step of moving the fixed-pivot camera support, the predetermined tolerance being a monotonically or strictly increasing function of the first distance.

(C1) denotes a fully-spherical imaging system for capturing a panoramic image of a scene includes a camera mount, a memory, and a microprocessor. The camera mount is configured to (i) hold a camera in a first orientation in which an optical axis of the camera extends in a first axis-direction away from the camera and (ii) hold the camera in a second orientation in which the optical axis extends in a second axis-direction differing from the first axis-direction. The memory stores non-transitory computer-readable instructions. The microprocessor is configured to be communicatively coupled to the camera and adapted to execute the instructions to: (i) capture, with the camera in the first orientation, a first image of a first scene-region of the scene, a first axial location on the optical axis when the first image is captured defining a first image-capture location; and (ii) capture, with the camera in the second orientation, a second image of a second scene-region of the scene when a second axial location on the optical axis is at the first image-capture location.

(C2) In any imaging system denoted by (C1), in which the camera is a single camera has a first optical axis corresponding to (i) in the first orientation, the optical axis extending in the first axis-direction and, (ii) in the second orientation, the optical axis extending in the second axis-direction, the camera mount may be a single camera mount configured to move the single camera from the first orientation and the second orientation and vice versa.

(C3) In any imaging system denoted by one of (C1) and (C2), in which the camera includes a first camera and a second camera, the camera mount may include (i) a first camera mount configured to hold the first camera in the first orientation and (ii) a second camera mount configured to hold the second camera in the second orientation.

(C4) In any imaging system denoted by one of (C1) through (C3), the second axis-direction may be 180° opposite the first axis-direction.

(C5) In any imaging system denoted by one of (C1) through (C4), the camera mount may be outside a field of view of the camera held in the camera mount.

(C6) In any imaging system denoted by one of (C1) through (C5), in which the camera has a lens, the first axial location may correspond to at least one of an entrance pupil and a nodal point of the lens.

(C7) In any imaging system denoted by one of (C1) through (C6), the first image-capture location may be directly above a first surface-location of a surface beneath the camera.

(C8) Any imaging system denoted by one of (C1) through (C7) may further include a sensor. The sensor is communicatively coupled to the microprocessor, for determining at least one of (a) a common speed of, and (b) a common distance travelled by the first camera mount and the second camera mount. The microprocessor may be further adapted to determine, using a signal generated by the sensor, when the second axial location is at the first image-capture location.

(C9) In any imaging system denoted by one of (C1) through (C8), the microprocessor may be collocated with the camera mount, the camera being communicatively coupled with the microprocessor.

(C10) Any imaging system denoted by one of (C1) through (C9), may further include the camera, wherein each of the camera is communicatively coupled to the microprocessor.

(D1) denotes a method capturing a panoramic image of a scene. The method includes a first image-capture step and a second image-capture step. The first image-capture step includes capturing, with a first camera having a first optical axis extending in a first axis-direction away from the first camera, a first image of a first scene-region of the scene, a first axial location on the first optical axis when the first image is captured defining a first image-capture location. The second image-capture step includes capturing, with a second camera having a second optical axis extending in second axis-direction differing from the first axis-direction, a second image of a second scene-region of the scene.

(D2) In the method denoted (D1), the second axis-direction may be 180° opposite the first axis-direction.

(D3) In any method denoted by one of (D1) and (D2), in the step of capturing the first image, the first image corresponding to a first field of view of the first camera that is at least 180 degrees in a plane intersecting the first image-capture location, the first camera may be attached to a first camera mount located outside the first field of view, and in the step of capturing the second image, the second image corresponding to a second field of view of the second camera that is at least 180 degrees in the plane, the second camera may be attached to a second camera mount located outside the second field of view.

(D4) Any method denoted by one of (D1) through (D3), may further include, after the step of capturing the first image and before the step of capturing the second image, moving the second camera in the first axis-direction.

(D5) When (a) the step of capturing the second image occurs at a first time interval after the step of capturing the first image, and (b) the first camera and the second camera are on a vehicle traveling at a first speed in the first axis-direction, any method denoted by one of (D1) through (D4) may further include determining the first time interval based on the first speed, and a distance between the first camera and the second camera in the first axis-direction.

(D6) In any method denoted by one of (D1) through (D5), when the first camera and the second camera is attached to a wheeled vehicle and are spatially separated by a first distance along the first axis-direction: the step of capturing the second image may occur when a wheel of the wheeled vehicle rotates, after the step of capturing the first image, by a predetermined amount corresponding to the first distance. Any method denoted by (D6) may further include determining when the wheel rotates by the predetermined amount.

(D7) In any method denoted by one of (D1) through (D6), the step of capturing the second image may occur when a second axial location on the second optical axis is at the first image-capture location.

(D8) In any method denoted by (D7), in which the first camera has a first lens and the second camera has a second lens: the first axial location may correspond to at least one of an entrance pupil and a nodal point of the first lens; and the second axial location may correspond to at least one of an entrance pupil and a nodal point of the second lens.

(D9) In any method denoted by on one of (D7) and (D8), the second scene-region may include an object at a first distance from second camera, and in the step of capturing the second image, the second axial location may remain directly above the first image-capture location within a tolerance that is a monotonically or strictly increasing function of the first distance.

Without departing from the scope hereof, changes may be made in the above fully-spherical imaging system, imaging system, and panoramic-image-capture methods. It should thus be noted that the matter contained in the above description or shown in the accompanying drawings should be interpreted as illustrative and not in a limiting sense. The following claims are intended to cover all generic and specific features described herein, as well as all statements of the scope of the present fully-spherical imaging system, imaging system, and panoramic-image-capture methods, which, as a matter of language, might be said to fall therebetween.

What is claimed is:

1. A fully-spherical imaging system for capturing a panoramic image of a scene, comprising:
    a first camera mount configured to hold a first camera in a first orientation in which (i) the first camera mount and any object attached thereto are outside a field of view of the first camera and (ii) a first optical axis of the first camera extends in a first axis-direction away from the first camera, a first axial location on the first optical axis being collocated with one of an entrance pupil and a nodal point of a first lens of the first camera, the field of view of the first camera exceeding 180 degrees in (i) a first plane that includes the first optical axis and the first camera mount and (ii) a second plane perpendicular to the first plane;
    a second camera mount configured to hold a second camera in a second orientation in which (i) the second camera mount and any object attached thereto is outside a field of view of the second camera and (ii) a second optical axis of the second camera extends in a second axis-direction away from the second camera and differing from the first axis-direction, a second axial location on the second optical axis being collocated one of an entrance pupil and a nodal point of a second lens of the second camera, a field of view of the second camera exceeding 180 degrees in (iii) a third plane that includes the second optical axis and the second camera mount and (iv) a fourth plane perpendicular to the third plane;
    a memory storing non-transitory computer-readable instructions; and
    a microprocessor configured to be communicatively coupled to the first camera and the second camera and adapted to execute the instructions to:
        capture, with the first camera in the first orientation, a first image of a first scene-region of the scene, the first axial location when the first image is captured defining a first image-capture location; and
        capture, with the second camera in the second orientation, a second image of a second scene-region of the scene when the second axial location is at the first image-capture location.

2. The fully-spherical imaging system of claim 1, the second axis-direction being 180° opposite the first axis-direction.

3. The fully-spherical imaging system of claim 1,
    the first image-capture location being directly above a first surface-location of a surface beneath the first camera;
    the memory further including instructions that, when executed by the microprocessor, control the second camera to capture the second image after the first camera captures the first image and when the second image-capture location is directly above the first surface-location.

4. The fully-spherical imaging system of claim 1, further comprising:
    a sensor, communicatively coupled to the microprocessor and including at least one of a speedometer and a tachometer, for determining at least one of (a) a speed of, and (b) a distance traveled by the second camera mount, each of the speed and distance being in a direction parallel to the second axis-direction, the microprocessor being further adapted to determine, using a signal generated by the sensor, when the second axial location is at the first image-capture location.

5. The fully-spherical imaging system of claim 4, the second axis-direction being 180° opposite the first axis-direction.

6. The fully-spherical imaging system of claim 1, the microprocessor being collocated with the first camera mount, the first camera being communicatively coupled with the microprocessor.

7. The fully-spherical imaging system of claim 1, further comprising the first camera and the second camera, the second camera being communicatively coupled to the microprocessor.

8. The fully-spherical imaging system of claim 1, further comprising a structural element that mechanically couples, and defines a fixed distance between, the first camera mount and the second camera mount, the structural element being outside the field of view of the first camera and the field of view of the second camera.

9. The fully-spherical imaging system of claim 8, the second axis-direction being parallel to and 180° opposite the first axis-direction, the fixed distance being along the first axis-direction.

10. The fully-spherical imaging system of claim 1, the memory further including instructions that, when executed by the microprocessor, control the second camera to capture the second image after the first camera captures the first image.

\* \* \* \* \*